United States Patent
Ma et al.

(10) Patent No.: US 9,228,917 B1
(45) Date of Patent: Jan. 5, 2016

(54) SIX DEGREES OF FREEDOM FREE-MOTION TEST APPARATUS

(71) Applicant: Arrowhead Center, Inc., Las Cruces, NM (US)

(72) Inventors: Ou Ma, Las Cruces, NM (US); Ken Ruble, Chaparral, NM (US)

(73) Assignee: Arrowhead Center, Inc., Las Cruces, NM (US)

(*) Notice: Subject to any disclaimer, the term of this patent is extended or adjusted under 35 U.S.C. 154(b) by 266 days.

(21) Appl. No.: 13/740,813

(22) Filed: Jan. 14, 2013

Related U.S. Application Data (63) Continuation-in-part of application No. 12/762,981, filed on Apr. 19, 2010, now Pat. No. 8,353,199.

(60) Provisional application No. 61/170,445, filed on Apr. 17, 2009, provisional application No. 61/692,946, filed on Aug. 24, 2012.

(51) Int. Cl.
  *B64C 17/00* (2006.01)
  *A63H 27/00* (2006.01)
  *G01M 1/02* (2006.01)

(52) U.S. Cl.
  CPC ....................................... *G01M 1/02* (2013.01)

(58) Field of Classification Search
  CPC ................................ B64C 17/00; A63H 27/00
  USPC ................................................. 73/65, 65.05
  See application file for complete search history.

(56) References Cited

U.S. PATENT DOCUMENTS

| | | | | |
|---|---|---|---|---|
| 2,674,500 | A | * | 4/1954 | Hukari .......................... 182/2.7 |
| 3,131,486 | A | | 5/1964 | Derschmidt |
| 3,225,458 | A | | 12/1965 | Glockl |
| 3,246,403 | A | | 4/1966 | Vaughen |
| 3,419,238 | A | * | 12/1968 | Flory .......................... 248/163.1 |
| 3,548,518 | A | | 12/1970 | McRae |
| 3,948,467 | A | * | 4/1976 | Krusius .......................... 244/116 |
| 4,120,099 | A | * | 10/1978 | Fett .................................. 434/32 |
| 4,601,663 | A | | 7/1986 | Allison et al. |
| 4,666,362 | A | * | 5/1987 | Landsberger et al. ........ 414/735 |
| 4,883,249 | A | | 11/1989 | Garland |
| 4,886,397 | A | | 12/1989 | Cherbonnier |
| 4,917,610 | A | * | 4/1990 | Whiteman ....................... 434/33 |

(Continued)

FOREIGN PATENT DOCUMENTS

| DE | 2051104 | | 4/1972 |
|---|---|---|---|
| EP | 0 437 741 | A2 | 7/1991 |
| SU | 1759731 | | 9/1992 |

OTHER PUBLICATIONS

Lu, QI et al., "A Gravity Balanced Test Stand for Flight Testing of Small/Micro Unmanned Aerial Vehicles", Proceedings of IMECE2008, 2008 ASME International Mechanical Engineering Congress and Exposition, Oct. 31-Nov. 6, 2008, Boston, Massachusetts, Oct. 31, 2008, 1-7.

*Primary Examiner* — Lisa Caputo
*Assistant Examiner* — Jamel Williams
(74) *Attorney, Agent, or Firm* — Deborah A. Peacock; Justin R. Jackson; Peacock Myers, P.C.

(57) ABSTRACT

The present invention is a test object apparatus for testing space objects. The test apparatus provides the space object with six degrees of freedom for testing. The test apparatus is statically balanced in order to achieve a microgravity condition for testing.

20 Claims, 7 Drawing Sheets

(56) References Cited

U.S. PATENT DOCUMENTS

| | | | |
|---|---|---|---|
| 5,397,323 A | 3/1995 | Taylor et al. | |
| 5,678,999 A * | 10/1997 | Cicare | 434/33 |
| 6,539,333 B1 | 3/2003 | Metelski | |
| 6,659,839 B2 * | 12/2003 | Iwasawa | 446/230 |
| 7,367,772 B2 | 5/2008 | Khajepour et al. | |
| 7,370,842 B2 | 5/2008 | Fritz | |
| 7,601,104 B2 | 10/2009 | Agrawal et al. | |
| 7,874,223 B2 | 1/2011 | Sugar et al. | |
| 8,152,699 B1 | 4/2012 | Ma et al. | |
| 8,188,843 B2 | 5/2012 | Helmer et al. | |
| 8,353,199 B1 * | 1/2013 | Ma et al. | 73/65.05 |
| 2006/0213305 A1 * | 9/2006 | Sugar et al. | 74/490.01 |
| 2006/0241539 A1 | 10/2006 | Agrawal et al. | |
| 2006/0260621 A1 | 11/2006 | Agrawal et al. | |
| 2007/0080275 A1 | 4/2007 | Stachowski et al. | |
| 2009/0215588 A1 | 8/2009 | Riener et al. | |
| 2010/0019890 A1 * | 1/2010 | Helmer et al. | 340/407.1 |

\* cited by examiner

SIX DEGREES OF FREEDOM FREE-MOTION TEST APPARATUS

CROSS-REFERENCE TO RELATED APPLICATIONS

This application is a continuation-in-part application to U.S. patent application Ser. No. 12/762,981, titled "Multi-Degree-of-Freedom Test Stand for Unmanned Air Vehicles", to Ou Ma et al., filed on Apr. 19, 2010, which claims priority to and the benefit of U.S. Provisional Patent Application No. 61/170,445, titled "Multi-Degree of Freedom Test Stand for Unmanned Air Vehicles", filed on Apr. 17, 2009 and the specifications and claims of those applications are incorporated herein by reference.

This application claims priority to and the benefit of the filing of U.S. Provisional Patent Application Ser. No. 61/692,946, entitled "Six Degrees of Freedom Free-Motion Test Apparatus", filed on Aug. 24, 2012, and the specification thereof is incorporated herein by reference.

STATEMENT REGARDING FEDERALLY SPONSORED RESEARCH OR DEVELOPMENT

The U.S. Government has sponsored in-part research for this invention, which gives the government certain rights in the invention as provided for by the terms of Contract No. FA9453-11-1-0306 and Contract No. FA9453-11-1-0307 awarded by the U.S. Air Force.

BACKGROUND OF THE INVENTION

1. Field of the Invention (Technical Field)

Embodiments of the present invention relate to a testing apparatus for space objects and more particularly to a multiple degree-of-freedom (DOF) gravity balanced space object testing apparatus.

2. Background

Physical simulation or testing of six degrees-of-freedom (DOFs) free-motion of an object in a partial-gravity or micro-gravity condition is often required for research and practice in aerospace industry. There is an increasing need for testing of six DOF free-motion objects because of increasing satellite on-orbit-service missions and orbit cleanup missions. The current techniques for simulating free-motion in space either cannot achieve full six DOFs (air-bearing based floating) or can achieve six DOFs but in a very short time period (about 10-30 seconds) and require very expensive facilities (aircraft, suborbital flight) or can achieve six DOFs but with altered dynamics properties (neutral buoyancy). Embodiments of the present invention are a simple, reliable, and low-cost solution.

Passive gravity balancing of a mechanical system or mechanism refers to the condition where no joint forces are required to keep the system or mechanism in equilibrium for all the configurations in its workspace. Basically, two approaches, namely, using counterweight or using springs, are available to achieve passive gravity balancing. However, using counterweight adds additional mass to the system resulting in larger moments and products of inertia of the system. Alternatively, gravity balancing with springs requires that the total potential energy (including both the gravitational energy and the elastic energy) of the mechanism remains constant at any configuration in its workspace. This approach keeps the mechanism balanced with a much smaller total mass. Some gravity balanced mechanisms using springs have been designed to serve as rehabilitation devices that compensate the gravity of patients' arms or legs.

Embodiments of the present invention comprise a multi-DOF passive space object test apparatus that preferably employs springs to achieve gravity balancing at each configuration within the workspace. All of the weight of the entire moving part of the test stand is self-balanced, such that no static load is exerted on the tested vehicle, allowing the object to be tested under a condition that is very similar to a micro-gravity condition.

BRIEF SUMMARY OF THE INVENTION

One embodiment of the present invention comprises a gravity balanced apparatus for testing a space object. This embodiment comprises an inner arm and an outer arm. The inner arm and the outer arm provide at least three degrees of freedom to the space object. Each of the arms preferably comprises a parallelogram. A gimbal, preferably an adjustable gimbal, is disposed on the outer arm. The gimbal provides at least three degrees of freedom to the space object. At least two springs, preferably balancing springs, are attached to the gravity balanced apparatus, wherein the springs achieve gravity balancing. This embodiment can comprise one or more adjustment mechanisms for adjusting one or more attachment locations of the two or more springs. The adjustment mechanism preferably comprises a sliding apparatus. In this embodiment, the arms provide three translational degrees of freedom to the space object, and the gimbal provides three rotational degrees of freedom to the space object. Each of the arms preferably comprises four member portions, each portion forming a side of the arm. Two of the member portions are substantially vertical member portions. At least one of the springs is preferably disposed between the substantially vertical member portions. One of the substantially vertical member portions is located between and forms an end of both the inner arm and the outer arm. In addition, one of the substantially vertical member portions comprises a connector for connecting to the gimbal. The member portions are preferably connected to each other via ball bearings.

In one embodiment of the present invention, one of the substantially vertical member portions preferably acts as a base for the apparatus. At least one of the springs is disposed on the base. At least one of the springs preferably comprises a spring adjustment knob for adjusting at least one of the two or more springs.

In one embodiment of the present invention, a cable is disposed between the substantially vertical member portions. In this embodiment, a first adjustment mechanism is used for adjusting the cable.

Another embodiment of the present invention comprises a method for testing a space object. The method of this embodiment comprises providing a testing apparatus comprising an inner arm and an outer arm, the arms providing at least three degrees of freedom to the object, disposing a gimbal on the outer arm of the apparatus, the gimbal providing at least three degrees of freedom to the object, attaching the object to the gimbal, gravity balancing the apparatus via at least two springs, and testing the object. This embodiment can further comprise allowing the object to freely tumble in all axes. In this embodiment, the arms preferably provide three translational degrees of freedom and the gimbal provides at least three rotational degrees of freedom.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Test object or space object is defined throughout the specification and claims as a solid object that is launched above the Earth's atmosphere and wherein the object is in a zero gravity (also sometime referred to as microgravity) or partial gravity condition, including but not limited to satellites, space vehicles, space debris, combinations thereof and the like.

Microgravity condition is defined throughout the specification and claims as zero gravity or a force of gravity so low that weightlessness occurs.

Gimbal is defined throughout the specification and claims as an interconnection that allows one part of a mechanism or apparatus to revolve independently of another part.

Spring is defined throughout the specification and claims as any elastic device or other system or structure capable of substantially gaining all or a portion of its original shape after being compressed or extended, including but not limited to, a coil of wire.

Embodiments of the present invention comprise an apparatus and method that provide physical simulation or testing of objects with multiple degrees-of-freedom (DOF) situations, preferably six DOF in a microgravity condition. Free-motion of an object in microgravity condition is often performed for research and practice in the aerospace industry. The need to test objects in a microgravity condition is increasing as satellite on-orbit-service missions are increased and orbit cleanup missions are increased.

Figure 1:
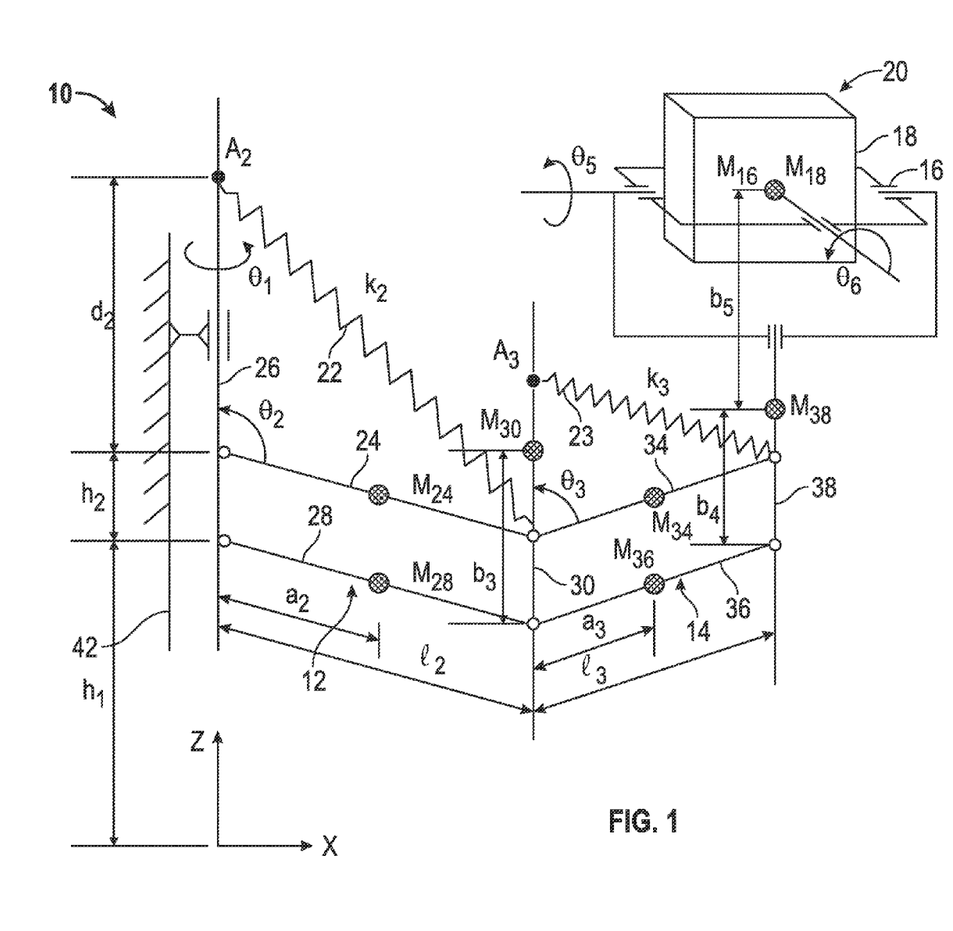
FIG. 1 illustrates an embodiment of the present invention comprising a six-DOF free-motion test apparatus and its kinematics notation.
Figure 3:
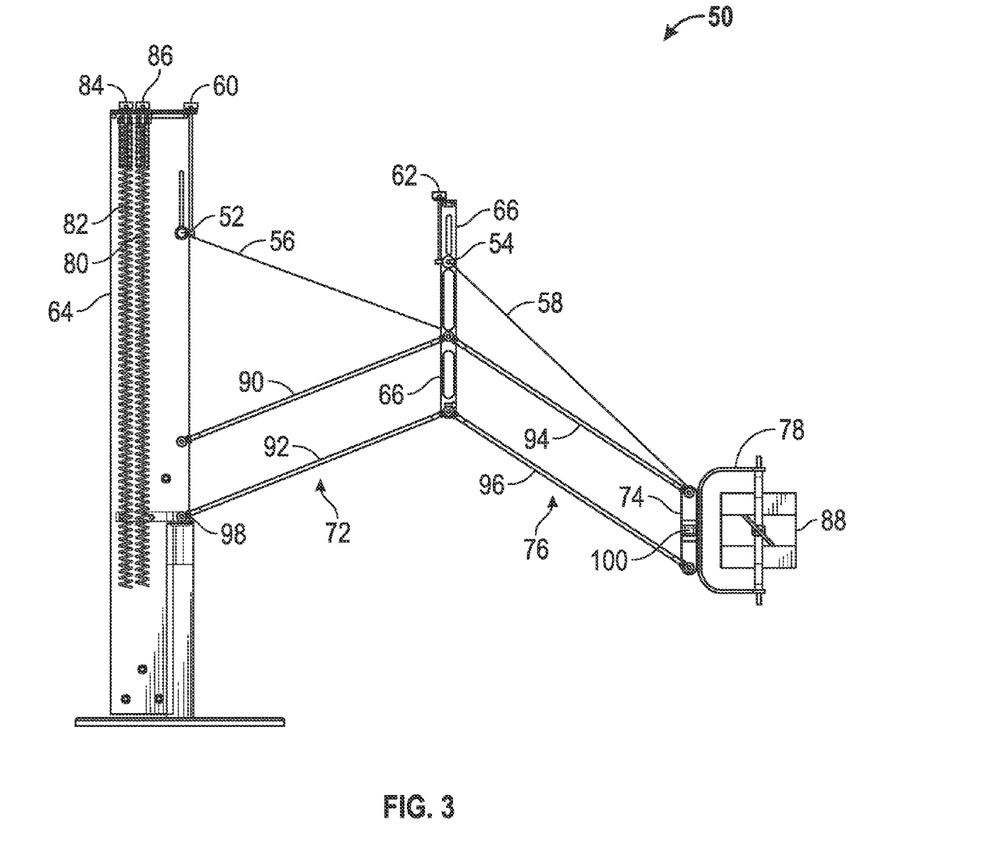
FIG. 3 illustrates an assembly drawing of a six-DOF free-motion test apparatus comprising springs and cables.

Referring to FIG. 1, in one embodiment of the present invention, a free-motion test apparatus is used to test a space object such as, for example, a satellite to free float and free rotate in a three-dimensional space. The test apparatus in this embodiment preferably provides the test object a full six degrees of freedom (six DOF) of maneuverability and is able to fully compensate the weight of the object in all the six DOF. As illustrated in FIG. 1, test apparatus 10 comprises base 42, inner arm 12, outer arm 14, gimbal 16 and test object 18. Test apparatus 10 has a plurality of joints and one or more of them are independent joints, which provide a 6-DOF motion of test object 18 at end 20 of test apparatus 10. Test object 18 is preferably disposed in or on gimbal 16. Gimbal 16 is preferably attached to end 20 of apparatus 10. Gimbal 16 can be attached as shown in FIG. 1 or FIG. 3 or any other configuration. Attaching gimbal 16 to the end of outer arm 14 such that the first joint axis of gimbal 16 is substantially vertical, as shown in FIG. 1, results in the elimination of the cantilever design. The rotational angles of the six independent one-DOF joints are denoted by $\theta_1, \theta_2, \ldots, \theta_6$, respectively. The geometric dimensions are described by $a_i, b_i, l_i$ (i=1, 2, ...). Further, the masses of the individual sections are marked as $m_{16}, m_{18}, \ldots, m_{38}$ where $m_{18}$ is the mass of the test object. It is preferred that the mass center of object 18 is coincident with the pivoting center of three-DOF gimbal 16.

As illustrated in FIG. 1, test apparatus 10 preferably comprises inner arm 12 and outer arm 14 having member portions 24, 26, 28, 30, 34, 36 and 38. Member portions 24, 26, 28, 30, 34, 36 and 38 are preferably movably connected via ball bearings or any other fasteners. Inner arm 12 (i.e., member portions 24, 26, 28 and 30) preferably forms a parallelogram. Outer arm 14 (i.e., member portions 30, 34, 36 and 38) also preferably forms a parallelogram. Inner arm 12 and outer arm 14 as well as base 42 are preferably movably connected via ball bearings. However, other fasteners can also be used for connecting inner arm 12 and outer arm 14 (member portions 24, 26, 28, 30, 34, 36, 38 and 42). For example, pins, bolts, nails, glue, tape buttons, snaps, hinged pins, slidable pins, screws, threaded pins, bracket screws, pegs, rotatable fasteners, ball and socket fasteners, combinations thereof and the like can be used to moveably connect member portions 24, 26, 28, 30, 34, 36, 38 and 42.

Inner arm 12 and outer arm 14 are preferably movable. Inner arm 12 is preferably movably hinged to a fixed surface on one end and moveably attached to outer arm 14 on a second end, opposite of the first end. Outer arm 14 is preferably movably attached to inner arm 12 at a first end and fixedly attached to gimbal 16 on a second end, opposite of the first end. Gimbal 16 is preferably attached to member portion 38 of outer arm 14 via bearing 100 (shown in FIG. 5). Gimbal 16 can optionally be attached to member portion 38 using any known connector. Outer arm 14 and gimbal 16 rotate with respect to each other about a substantially horizontal axis, which is the axis with the bearing. Gimbal 16 is preferably attached to test object 18 via shaft 32 (see FIG. 2). Shaft 32 can be one or more portions passing through test object 18. Shaft 32 can also optionally be two portions on opposite ends of gimbal 16. Inner arm 12 and outer arm 14 preferably provide three translational DOF to test object 18 and can preferably move up and down, out and in, and back and forth. Gimbal 16 preferably provides three rotational DOF to test object 18 and can preferably provide pitch, roll and yaw. Thus, test apparatus 10 provides a total of six DOF to test object 18, three DOF of which are provided by inner arm 12 and outer arm 14 and the other three are provided by gimbal 16 (pitch, roll, and yaw).

Springs 22 and 23 of FIG. 1 preferably balance with weight of the moving parts of test apparatus 10. Spring 22 (with stiffness $k_2$) is preferably disposed between member portions 26 and 30 of inner arm 12; while spring 23 (with stiffness $k_3$) is preferably disposed between member portions 30 and 38 of outer arm 14.

Figure 2:
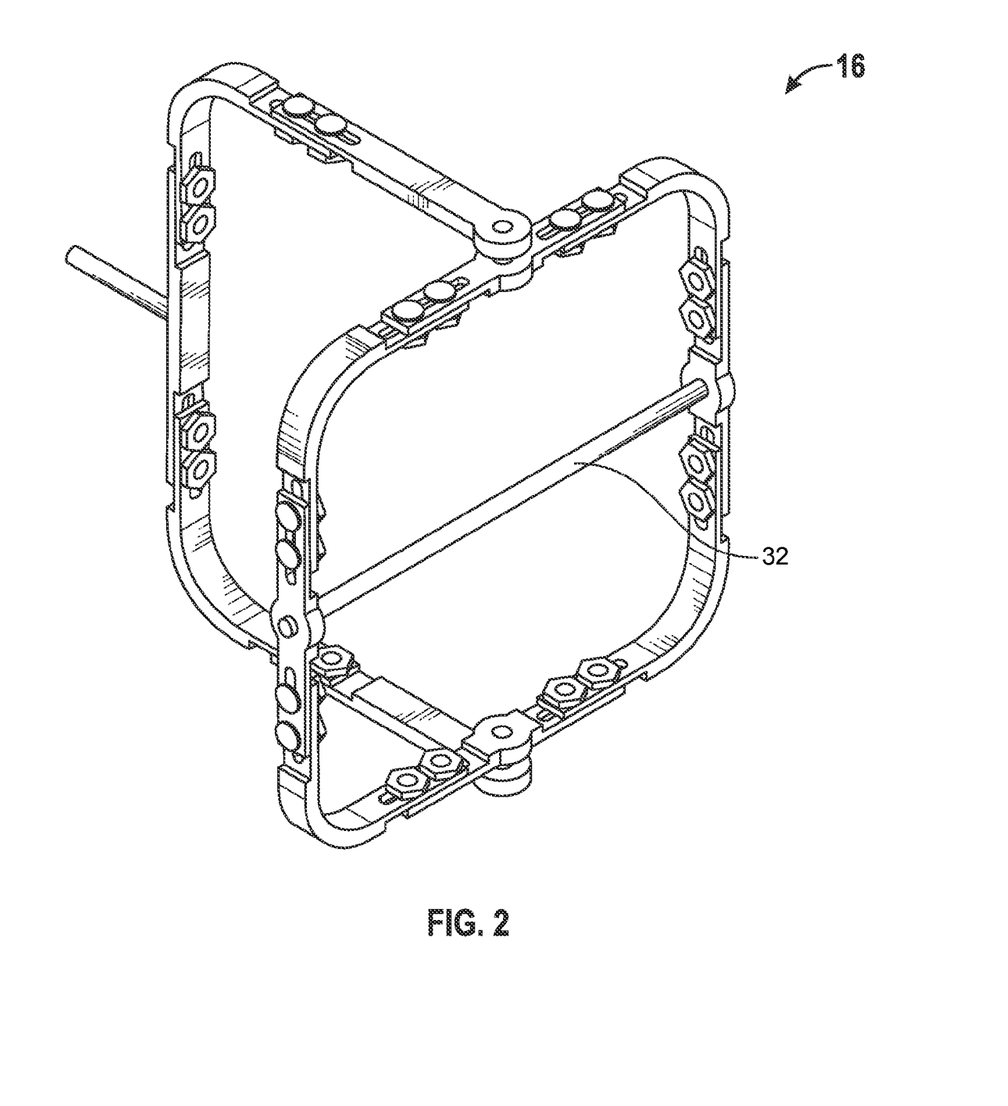
FIG. 2 illustrates an embodiment of the present invention comprising a three-DOF adjustable gimbal.
Figure 5:
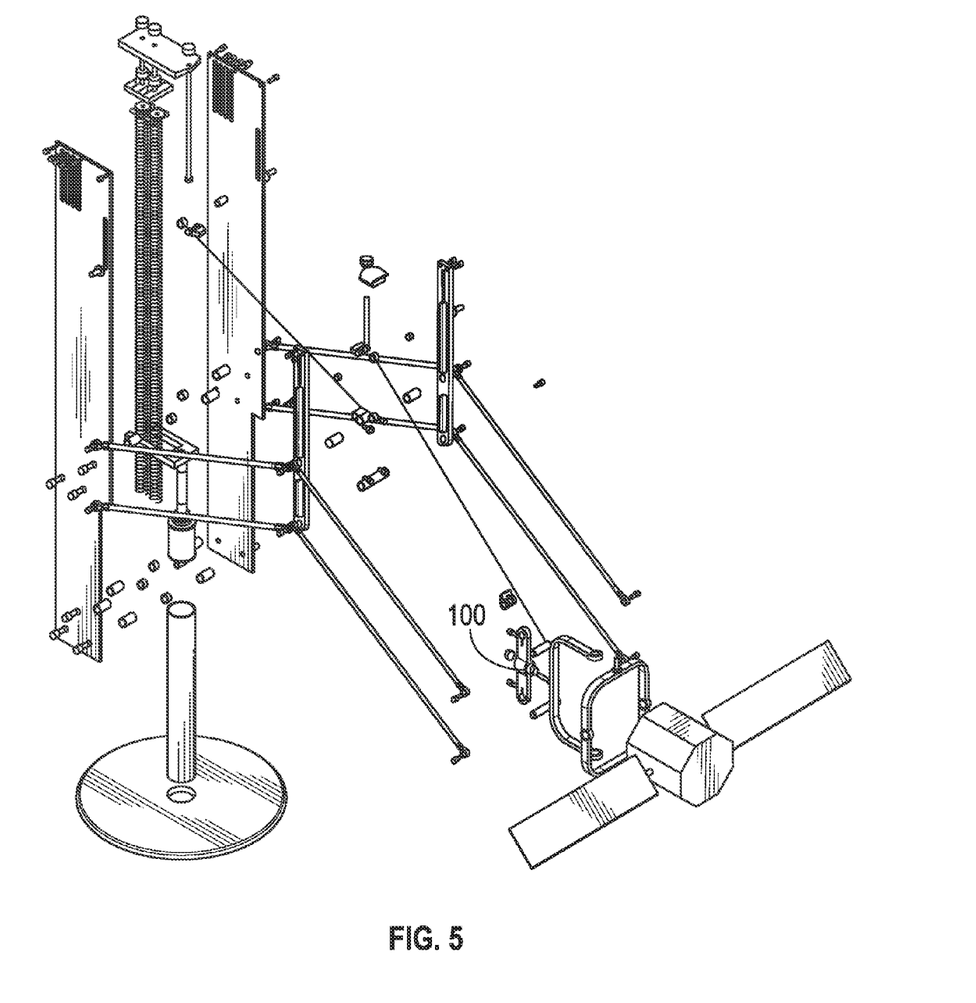
FIG. 5 illustrates an assembly of a six-DOF free-motion test apparatus.

In one embodiment of the present invention, test object 18 is secured to gimbal 16 using shaft 32 (shown in FIG. 2) and bearings on both ends of shaft 32 (shown in FIGS. 1, 2 and 5). The shaft may be replaced by two shorter shafts on both ends of the original shaft. In an alternative embodiment, the mounting point of test object 18 to gimbal 16 serves as one of the DOFs and thus connects test object 18 to gimbal 16 via a rotational joint (e.g., ball bearings or the like). The center of gravity (CG) of the test object then passes pass thru this mounting point. Test object 18 can be secured to gimbal 16 utilizing an existing mounting point on test object 18 assuming that point is aligned with the CG of test object 18 (such as the shaft mounted test object illustrated in FIG. 1) or test object 18 can optionally be counterweighted to shift the CG to pass thru the desired existing mounting point (see below). If a different mounting point on test object 18 is desired which does not have an existing mount, an adapter bracket can be mounted to test object 18 to secure it to gimbal 16.

Test apparatus 10 of FIG. 1 are preferably 6-DOF free-motion test apparatuses for simulating free motion and free tumbling of a space object in space. Below is a non-limiting example of a set of specifications (in Table 1) as an example basis for a test apparatus.

TABLE 1

Top level specification of the test apparatus

| Requirements | Specifications | Remarks |
| --- | --- | --- |
| Total Degrees of Freedom | 6-DOF | 3-DOF Stand and 3-DOF Gimbal |
| Horizontal Motion Range | Depending on application need | Primary requirement |
| Vertical Motion Range | Depending on application need | Primary requirement |
| Arm Rotational | about 360° about vertical axis | 3-DOF Stand |
| Pitch range of the object | about 360° | 3-DOF Gimbal |
| roll range of the object | about 360° | 3-DOF Gimbal |
| Yaw range of the object | about 360° | 3-DOF Gimbal |
| Weight of the object | Depending on application need | Primary requirement |
| Size of the object | Depending on application need | Primary requirement |
| Maximum System Height | Depending on required motion range | Secondary requirement |
| Maximum System Length | Depending on required motion range | Secondary requirement |
| Gravity compensation level | Preferably 0 gravity force | All the weights are offloaded |

Referring to FIGS. 3-6, another embodiment of the present invention comprises test apparatus 50. In this embodiment, test apparatus 50 comprises inner arm 72, outer arm 76, gimbal 78 and test object 88. Inner arm 72 comprises member portions 64, 66, 90 and 92. Outer arm 76 comprises member portions 66, 74, 94 and 96. This embodiment also comprises adjustment mechanisms 52 and 54, which are preferably adjustable pulleys or sliding mechanisms, and arm cables 56 and 58. A first end of arm cable 56 is preferably disposed at adjustment mechanism 52 and a second, opposite end of arm cable 56 is disposed on member portion 66 at the location where inner arm 72 is attached to member portion 66. A first end of arm cable 58 is disposed on adjustment mechanism 54 and a second, opposite end of arm cable 58 is disposed on member portion 74 at the location where outer arm 76 is attached to member portion 74. Adjustment mechanisms 52 and 54 and arms cables 56 and 58 are preferably adjusted in a substantially vertical direction using knobs 60 and 62 disposed on member portion 64 and member portion 66, respectively. The adjustment is preferably performed by sliding arm cable 56 and/or arm cable 58 up or down adjustment mechanisms 52 and 54. Adjustment mechanism 52 of cable 56 and adjustment mechanism 54 of cable 58 are used to adjust test apparatus 50 for testing different test objects which have different weights. Adjustment mechanisms 52 and 54 can also be used to adjust test apparatus 50 for offloading different level of gravity (e.g., just removing ⅚ of the weight for simulating the gravity on the Moon).

This embodiment also comprises springs 80 and 82 disposed on member portion 64. Springs 80 and 82 are preferably adjusted via spring adjuster knobs 84 and 86. Gimbal 78 is disposed on outer arm bracket 74. Test object 88 is preferably disposed on or in gimbal 78. Member portions 90 and 92 of inner arm 72 are preferably substantially parallel and both member portions 90 and 92 are attached at a first end to member portion 64 and attached at a second, opposite end to member portion 66. Member portions 94 and 96 of outer arm 76 are preferably substantially parallel and are attached at a first end to member portion 66 and attached at a second, opposite end to member portion 74. Member portion 92 is connected or attached to member portion 64 at pivot point 98. Member portion 64 is preferably connected to a base via a ball bearing interface to provide rotation in the yaw axis.

Figure 4A:
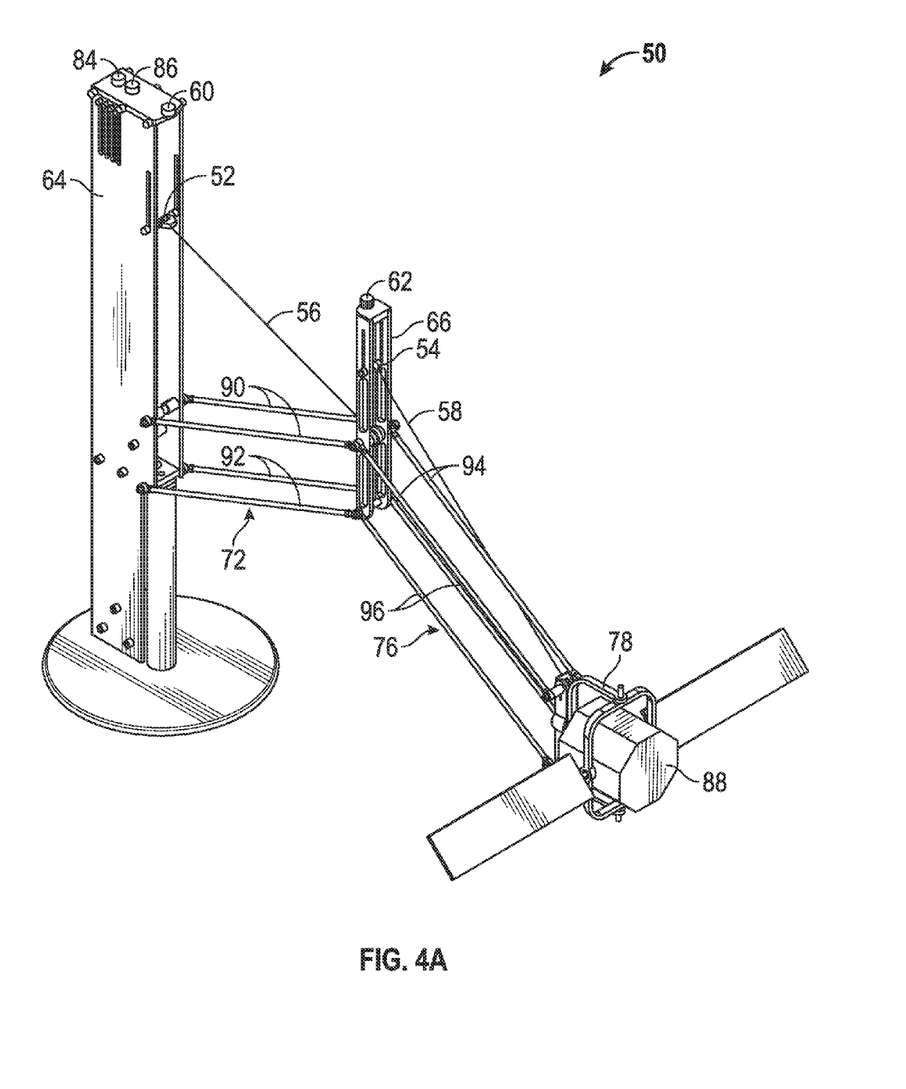
FIGS. 4A-4B illustrate assembly drawings of a test apparatus comprising a test object.
Figure 4B:
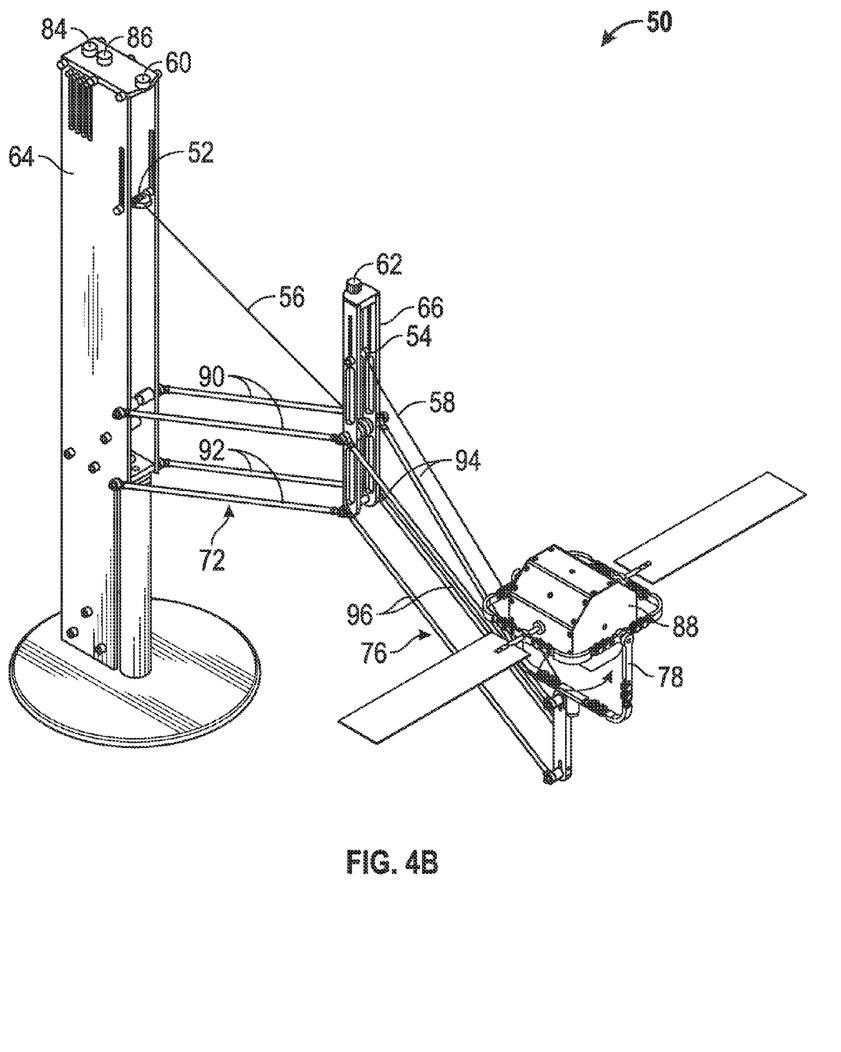

Referring to FIGS. 4A and 4B, gimbal 78 can be attached in different positions. For example, in FIG. 4B, gimbal 78 can be turned approximately 90 degrees to make its first rotational axis substantially vertical. Attaching gimbal 78 to the end of outer arm 76 such that the first joint axis of gimbal 78 is substantially vertical can result in favorable dynamic properties because of the elimination of the cantilever design.

Principle of Full Gravity Offloading

To achieve the zero gravity condition of a test object, the weight of the test apparatus including the test object is preferably statically balanced. This means that the total potential energy of the test apparatus contributed by both the gravity field and the springs remains constant for all the working configurations of the test apparatus in its workspace. This can be mathematically described as:

$$V_{total} = V_m + V_s = \text{Constant} \quad (1)$$

where, $v_m$ and $v_s$ represent the potential energies of the test apparatus including the object and the springs in the system, respectively. Under the condition given by Eq. (1), all the gravity effect is preferably reduced to about zero. The total potential energy of a general six-DOF statically balanced test apparatus can be expressed in terms of the joint angles, $\theta_i$ (i=1, 2, . . . , 6), as follows:

$$V_{Total} = V_M + V_S = C_0 + \sum_{i=1}^{6} C_i \cos\theta_i = \text{constant} \quad (2)$$

where $C_0$ is a constant and all the other coefficients $C_1$, $C_1, \ldots, C_6$ are functions of $\theta_i$ (i=1, 2, ..., 6) and they must be all zero for achieving constant potential energy at all configurations.

Based on the apparatus shown in FIG. 1, the total potential energy can be expressed as follows:

$$\begin{aligned} V_{Total} = & (h_1 + h_2 + a_2\cos\theta_2)m_{24}g + (h_1 + a_2\cos\theta_2)m_{28}g + \\ & (h_1 + l_2\cos\theta_2 + b_3)m_{30}g + (h_1 + h_2 + l_2\cos\theta_2 + a_3\cos\theta_3)m_{34}g + \\ & (h_1 + l_2\cos\theta_2 + a_3\cos\theta_3)m_{36}g + (h_1 + l_2\cos\theta_2 + l_3\cos\theta_3 + b_4)m_{38}g + \\ & (h_1 + l_2\cos\theta_2 + l_3\cos\theta_3 + b_5)(m_{16} + m_{18})g + \\ & \frac{1}{2}k_2(d_2^2 + l_2^2 - 2d_2l_2\cos\theta_2) + \frac{1}{2}k_3(d_3^2 + l_3^2 - 2d_3l_3\cos\theta_3) \end{aligned} \quad (3)$$

where g is the gravity acceleration; $k_1$, and $k_2$ are the spring constants of the two springs; $m_{16}$, $m_{18}$, $m_{24}$, $m_{28}$, $m_{30}$, $m_{34}$, $m_{36}$, and $m_{38}$ are the masses of member portions 16, 18, 24, 28, 30, 34, 36 and 38, respectively; and all the other parameters specify geometry dimensions and mass centers locations of the relevant member portions as defined in FIG. 1. Comparing equations (2) and (3), the coefficients of equation (30) can be found:

$$\begin{aligned} C_0 = & (h_1 + h_2)m_{24}g + h_1 m_{28}g + (h_1 + b_3)m_{30}g + \\ & (h_1 + h_2)m_{34}g + h_1 m_{36}g + (h_1 + b_4)m_{38}g + \\ & (h_1 + b_5)(m_{16} + m_{18})g + \frac{1}{2}k_2(d_2^2 + l_2^2) + \frac{1}{2}k_3(d_3^2 + l_3^2) \end{aligned} \quad (4)$$

$$C_2 = a_2(m_{24} + m_{28})g + l_2 m_{30}g + \\ l_2(m_{34} + m_{36})g + l_2(m_{38} + m_{16} + m_{18})g - k_2 d_2 l_2$$

$$C_3 = a_3(m_{34} + m_{36})g + l_3(m_{16} + m_{18} + m_{38})g - k_3 d_3 l_3$$

$$C_1 = C_4 = C_5 = C_6 = 0$$

Based on above-mentioned conditions for full gravity off-loading, $C_2$ and $C_3$ must be zero, from which the stiffness values of the two springs of the mechanism can be determined:

$$k_2 = \frac{a_2(m_{24} + m_{28}) + l_2(m_{16} + m_{18} + m_{30} + m_{34} + m_{36} + m_{38})}{d_2 l_2}g \quad (5)$$

$$k_3 = \frac{a_3(m_{34} + m_{36}) + l_3(m_{16} + m_{18} + m_{38})}{d_3 l_3}g$$

Such a set of springs preferably keeps the total potential energy of the system substantially constant for any configuration of the mechanism because now the total potential energy is independent of the configuration variables. In other words, the gravity effect on the test apparatus itself and the attached object is fully compensated.

Note that the set of springs defined by Eq. (5) is only capable of reducing the gravity for a particular object because the determined spring stiffness values are dependent on the specific mass of the object, i.e., the parameter $m_{18}$. Thus, when the test apparatus is used to test a different object, a new set of springs with different stiffness values is installed. This can be inconvenient in practice. A solution to this problem is to use the same set of springs for every object but have the springs' attachment points be adjustable, namely, to change the $d_2$ and $d_3$ values for a different object. For example, one can vertically adjust the spring attachment points $A_2$ and $A_3$, as indicated in FIG. 1, based on the mass property of the object attached to the apparatus. The amount of adjustment is based on the same static balancing conditions, which can be:

$$d_2 = \frac{a_2(m_{24} + m_{28}) + l_2(m_{16} + m_{18} + m_{30} + m_{34} + m_{36} + m_{38})}{k_2 l_2}g \quad (6)$$

$$d_3 = \frac{a_3(m_{34} + m_{36}) + l_3(m_{16} + m_{18} + m_{38})}{k_3 l_3}g$$

where the spring stiffnesses $k_2$ and $k_3$ are fixed values. These relations also allow adjustment of the test apparatus to compensate any small errors in a known mass of the test object.

Adjustable Gimbal

To accommodate test objects of different sizes, a 3-DOF gimbal is preferably size adjustable, as shown in FIG. 2. Since the size of a gimbal does not need to be continuously adjustable, for ease of balancing the object in the gimbal, the size adjustment of a gimbal ring is discrete via mechanical engagement of each mounting fastener, preferably a bolt, and a cylindrical cut on the sliding sections of the gimbal ring. A test object is preferably secured to the gimbal so that the center of gravity of the test object is aligned with three pivot points of the gimbal. Mounting of the test object was described above. Once mounted, the balance of the test object can be adjusted by the use of counterweights, if necessary. These weights can be attached to the test object by interface brackets or by using screws, magnets, glue, combinations thereof or the like.

EXAMPLE

The following is a non-limiting example.

Based on the embodiment shown in FIG. 1, an example test apparatus for simulating the free motion of a satellite was built. FIGS. 3 and 4 show assembly drawings of the test apparatus in two different views.

The mechanical system of the test apparatus is preferably comprised of off-the-shelf items along with custom fabricated components. For this example, many off-the-shelf items were chosen to be used as designed or modified to fit the particular application.

Mounting the satellite to the test apparatus was preferably based on customer recommendations. For the example apparatus, shafts that attach the simulated solar panels to the main body of the test object were used to mount the satellite to the gimbal, as this was a convenient point that is coaxial to one of the pivot axis.

The selection of the springs was first determined through analysis as described above.

$k_2 = 0.414$ lb/in and $k_3 = 1.006$ lb/in

These calculated data were adjusted by hardware experiment in an integration phase. The later step was necessary because the analysis was based on theoretical model of the system and data, which do not perfectly match the manufactured hardware. For example, the theoretical analysis model could not include all the manufacturing tolerances, friction, component deflections, etc. and thus, the analytically computed spring parameters were finalized after the hardware components were made and assembled. Once the spring parameters (the dimensions, masses and stiffness values) were determined, the best matching spring products in the market were purchased (customer-built springs were not purchased for this example). Two spring adjustment knobs (see, for example, FIG. 4) were designed to adjust the stretch and thus the initial force of the springs which took care of the slight mismatch of the expected springs and the ones purchased from the market.

Other than the two spring adjustment knobs, another two adjusting knobs (see, for example, FIGS. 3 and 5) were designed to adjust the cable positions. The cable adjustment knobs adjust the positions of the cable for the inner and outer arms.

All the above-mentioned knobs in the example apparatus were manually adjustable. They are preferably mechanically locked once the correct adjustment positions have been reached. In the alternative, these spring and pulley adjustments can be automatically controlled by a mechatronic system.

Based on the data, the highest tension force on the system was approximately 15-20 lbf (e.g., about 18 lbf) being applied by the outer arm spring with the lowest D-distance geometry. The longest spring stretch that the system saw was about 25-30 inches (e.g., about 29 inches) to balance the system through the full range of geometry. This indicated that the system should be greater than about 30 inches in height to house the springs throughout the range of mobility. This dimension can be reduced if a set of stiffer springs are used, as suggested by equation (6).

On the apparatus of this example, the satellite mass center adjustments were built into the simulated satellite. This allowed the operator to adjust the mass center of the satellite to coincide with the common pivot point of all the three axes of the 3-DOF gimbal. In the alternative, the adjustments for the mass center of the satellite to coincide with the common pivot point of all three axes of the 3-DOF gimbal can be performed automatically. The mass center adjustments are preferably incorporated into the interface mount that attaches the satellite to the 3-DOF gimbal.

Figure 6:
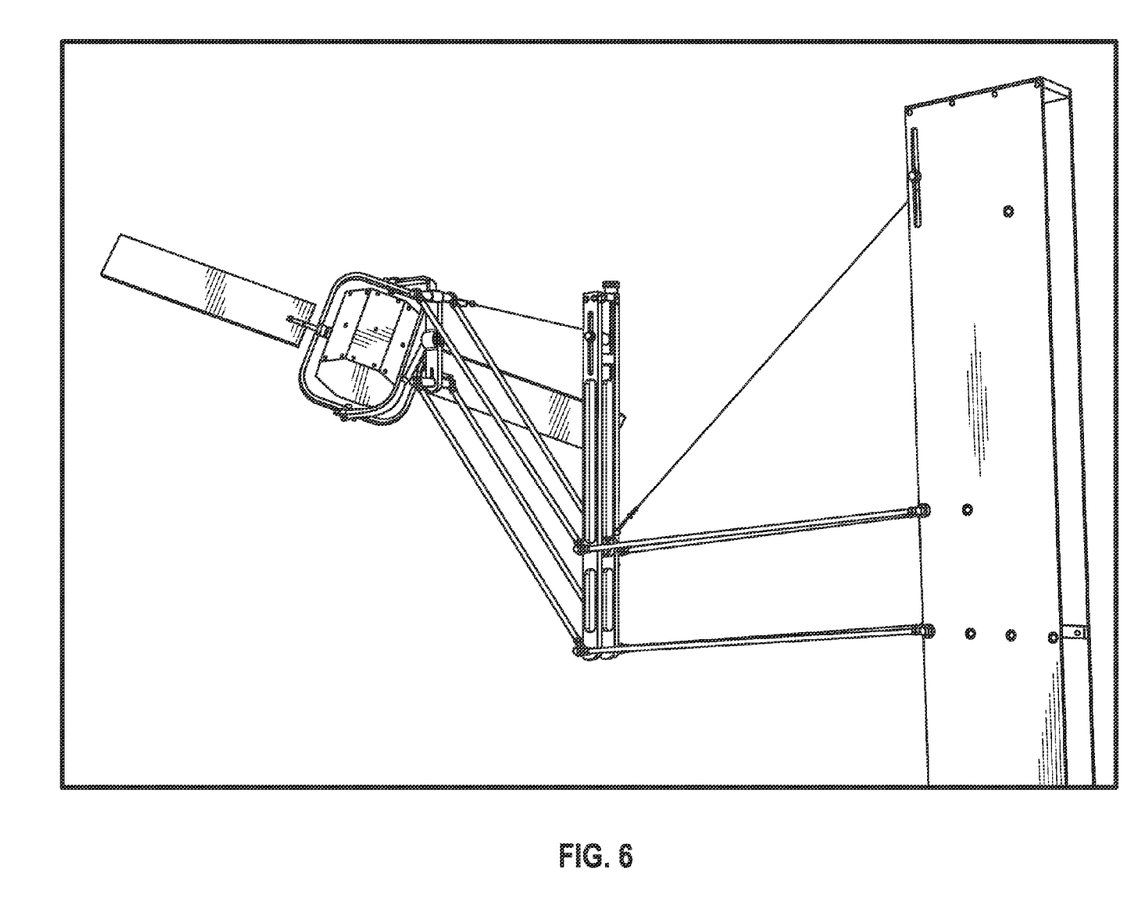
FIG. 6 illustrates an assembled six-DOF free-motion test apparatus.

An assembled apparatus is shown in FIG. 6. In this embodiment, the test object can rotate freely in pitch and roll and about ±75 degrees in yaw (because of the potential collision of the solar panels). If the solar panels are removed, the test object can free tumble in all axis. It can also freely translate in all the three axes within the arm's workspace.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

What is claimed is:

1. A gravity balanced apparatus for testing a space object comprising: an inner arm and an outer arm, said inner arm and said outer arm providing at least three degrees of freedom to the space object; a gimbal disposed on said outer arm, said gimbal providing at least substantially 360 degrees of rotation for pitch, roll, and yaw, to the space object; and at least two springs attached to said apparatus, wherein said springs achieve gravity balancing.

2. The apparatus of claim 1 further comprising one or more adjustment mechanisms for adjusting one or more attachment locations of said two or more springs.

3. The apparatus of claim 2 wherein said adjustment mechanism comprises a sliding apparatus.

4. The apparatus of claim 1 wherein each of said arms comprises a parallelogram.

5. The apparatus of claim 1 wherein said gimbal comprises an adjustable gimbal.

6. The apparatus of claim 1 wherein said arms provide three translational degrees of freedom to the space object.

7. The apparatus of claim 1 wherein said two or more springs comprise balancing springs.

8. The apparatus of claim 1 wherein each of said arms comprises four member portions, each portion forming a side of said arm.

9. The apparatus of claim 8 wherein two of said member portions comprise substantially vertical member portions.

10. The apparatus of claim 9 wherein at least one of said two or more springs is disposed between said substantially vertical member portions.

11. The apparatus of claim 9 wherein one of said substantially vertical member portions is located between and forms an end of both said inner arm and said outer arm.

12. The apparatus of claim 9 wherein one of said substantially vertical member portions further comprises a connector for connecting to said gimbal.

13. The apparatus of claim 8 further comprising ball bearings for connecting said member portions.

14. The apparatus of claim 9 wherein one of said substantially vertical member portions comprises a base.

15. The apparatus of claim 14 wherein at least one of said two or more springs is disposed on said base.

16. The apparatus of claim 15 further comprising a spring adjustment knob for adjusting at least one of said two or more springs.

17. The apparatus of claim 15 further comprising a cable disposed between said substantially vertical member portions.

18. The apparatus of claim 17 further comprising a first adjustment mechanism for adjusting said cable.

19. A method for testing a space object comprising: providing a testing apparatus comprising an inner arm and an outer arm, the arms providing at least three degrees of freedom to the object; disposing a gimbal on the outer arm of the apparatus, the gimbal providing at least substantially 360 degrees of rotation for pitch, roll, and yaw, to the object; attaching the object to the gimbal; gravity balancing the apparatus via at least two springs; and testing the object.

20. The method of claim 19 further comprising allowing the object to freely tumble in all axes.

* * * * *